US006861112B2

(12) United States Patent
Morris et al.

(10) Patent No.: US 6,861,112 B2
(45) Date of Patent: Mar. 1, 2005

(54) DISPERSION, COATING COMPOSITION, AND RECORDING MEDIUM CONTAINING SILICA MIXTURE

(75) Inventors: Michael D. Morris, Nashua, NH (US); Joanne Liu, Lowell, MA (US); Steven E. Brown, Tyngsboro, MA (US)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 10/295,983

(22) Filed: Nov. 15, 2002

(65) Prior Publication Data

US 2004/0097631 A1 May 20, 2004

(51) Int. Cl.$^7$ ................................. B41M 5/40
(52) U.S. Cl. .................. 428/32.21; 428/32.35; 428/32.37; 524/492; 524/493
(58) Field of Search .............. 428/32.21, 32.35, 428/32.37; 524/492, 493

(56) References Cited

U.S. PATENT DOCUMENTS

| | | |
|---|---|---|
| 3,620,978 A | 11/1971 | Moore |
| 3,691,089 A | 9/1972 | Janzon et al. |
| 3,719,607 A | 3/1973 | Moore |
| 3,864,142 A | 2/1975 | Kovarik |
| 3,956,171 A | 5/1976 | Moore et al. |
| 4,274,883 A | 6/1981 | Lumbeck et al. |
| 4,478,910 A | 10/1984 | Oshima et al. |
| 4,554,181 A | 11/1985 | Cousin et al. |
| 4,563,298 A | 1/1986 | Keiser |
| 4,612,138 A | 9/1986 | Keiser |
| 4,770,934 A | 9/1988 | Yamasaki et al. |
| 5,013,603 A | 5/1991 | Ogawa et al. |
| 5,246,624 A | 9/1993 | Miller et al. |
| 5,418,273 A | 5/1995 | Dromard et al. |
| 5,695,820 A | 12/1997 | Davis et al. |
| 5,714,235 A | 2/1998 | Takeuchi et al. |
| 5,725,946 A | 3/1998 | Fukushima et al. |
| 5,804,293 A | 9/1998 | Nehmsmann et al. |
| 6,114,022 A | 9/2000 | Warner et al. |
| 6,136,867 A | 10/2000 | Frouin et al. |
| 6,245,422 B1 | 6/2001 | Onishi et al. |
| 6,277,183 B1 * | 8/2001 | Johnson et al. .......... 106/31.27 |
| 6,284,819 B1 * | 9/2001 | Darsillo et al. ................ 524/22 |
| 6,365,264 B2 * | 4/2002 | Darsillo et al. .......... 428/32.34 |
| 6,443,570 B1 | 9/2002 | Chu et al. |
| 6,447,110 B1 | 9/2002 | Chu et al. |
| 6,447,111 B1 | 9/2002 | Gallo et al. |
| 2002/0012775 A1 | 1/2002 | Steiger et al. |

FOREIGN PATENT DOCUMENTS

| | | |
|---|---|---|
| EP | 0 507 998 1 | 10/1992 |
| EP | 0 732 219 A | 9/1996 |
| EP | 0 826 510 A | 3/1998 |
| EP | 0 655 346 B | 9/1998 |
| EP | 0 879 709 A | 11/1998 |
| EP | 0 826 510 B1 | 11/1999 |
| EP | 0 976 571 A1 | 2/2000 |
| EP | 0 995 718 A1 | 4/2000 |
| EP | 1 162 076 B1 | 9/2002 |
| WO | WO 95/23021 A1 | 8/1995 |
| WO | WO 01/18081 A1 | 3/2001 |
| WO | WO 01/98210 A1 | 12/2001 |

OTHER PUBLICATIONS

Brookfield Engineering Laboratories, Inc., "More Solutions to Sticky Problems" (Sep. 1998).
Chapman, "Coating Structure Effects On Ink–Jet Print Quality," *1997 Coating Conference*, pp. 73–93.
Iler, "The Chemistry of Silica, Solubility Polymerization, Colloid and Surface Properties, and Biochemistry", *Wiley-Interscience Publication*, pp. 364–407 (1979).
Triantafillopoulos, "Measurement of Fluid Rheology and Interpretation of Rheograms", *Kaltec Scientific, Inc.* (1998).
Witham, "Silica Pigment Porosity Effects on Color Ink Jet Printability," *IS&T's NIP 12: International Conference on Digital Printing Technologies*, pp. 409–417 (1996).

* cited by examiner

Primary Examiner—B. Shewareged

(57) ABSTRACT

The invention provides an aqueous dispersion comprising fumed silica particles, colloidal silica particles, and water. The fumed silica particles have a BET surface area of about 70 to about 140 m$^2$/g, and the colloidal silica particles have a BET surface area of about 110 to about 150 m$^2$/g. Also, the total amount of silica in the dispersion is about 35% to about 60% by weight, and the fumed silica particles comprise about 25% to about 80% by weight of the total amount of silica in the dispersion. The invention also provides a coating composition and a recording medium incorporating the inventive dispersion.

34 Claims, No Drawings

DISPERSION, COATING COMPOSITION, AND RECORDING MEDIUM CONTAINING SILICA MIXTURE

FIELD OF THE INVENTION

This invention pertains to aqueous dispersions comprising silica particles useful in the preparation of coating compositions and recording media.

BACKGROUND OF THE INVENTION

A surface coating is sometimes applied to a recording medium in order to improve its printing properties. For example, the coating can improve the appearance, ink absorption, and/or image smear resistance of the medium.

Surface coatings can be classified into two general categories—glossy coatings and non-glossy (matte or dull) coatings. Glossy coatings are often desirable, as they are very smooth, and can impart a superior feel and a photograph-like quality to a recorded image.

A coating composition comprising a pigment such as a hydrated aluminosilicate (such as a kaolin clay), titanium dioxide, alumina, silica, or calcium carbonate can be used to make a glossy coating if the composition is applied by cast coating, wherein the composition is dried while contacting a polished metal cylinder or drum (e.g., a polished chromium drum). A glossy pigment coating prepared in this manner is advantageous not only for its gloss, but because the pigment can impart a relatively high rate and capacity of ink absorption to the coating as well. However, the cast coating procedure is relatively slow and costly.

It is possible to make glossy pigment coatings using application methods which are cheaper and faster than cast coating (e.g., bar coating, air-knife coating, roll coating, etc., sometimes followed by calendering), but the overall gloss of the resulting coating is often diminished compared to cast coating. Moreover, glossy pigment coatings prepared using these rapid, inexpensive methods also can be quite brittle, and the coatings often crack and flake upon drying.

Coating compositions comprising resins such as polyolefin resin, polyester resin, polyamide resin, or polycarbonate resin can be applied using the aforementioned rapid, inexpensive coating methods (e.g., bar coating, air-knife coating, roll coating, etc.), to form coatings having a high gloss. However, a recording medium having such a glossy resin coating generally has significantly decreased rates of ink absorption and ink drying compared to a recording medium having a pigment coating.

A need exists for a recording medium having a coating that can be applied using a rapid, inexpensive coating procedure, wherein the coating is non-brittle, and wherein ink applied to the recording medium is rapidly absorbed, and rapidly dries. A need also exists for a coating composition that can be used in preparing such a recording medium, and for a dispersion that can be used to prepare such a coating composition. The invention provides such a recording medium, coating composition, and dispersion.

BRIEF SUMMARY OF THE INVENTION

The invention provides an aqueous dispersion comprising fumed silica particles, colloidal silica particles, and water. The fumed silica particles have a BET surface area of about 70 to about 140 $m^2/g$, the colloidal silica particles have a BET surface area of 110 to about 150 $m^2/g$, the total amount of silica in the dispersion is at least about 35% to about 60% by weight, and the fumed silica particles comprise about 25% to about 80% by weight of the total amount of silica in the dispersion.

The invention also provides a coating composition comprising at least one binder and the aqueous dispersion of the invention. The invention further provides a recording medium comprising a substrate and the coating composition of the invention applied to at least a portion of the substrate.

DETAILED DESCRIPTION OF THE INVENTION

The invention provides an aqueous dispersion comprising fumed silica particles, colloidal silica particles, and water, wherein the fumed silica particles have a BET surface area of about 70 to about 140 $m^2/g$, the colloidal silica particles have a BET surface area of 110 to about 150 $m^2/g$, the total amount of silica in the dispersion is at least about 35% to about 60% by weight, and the fumed silica particles comprise about 25% to about 80% by weight of the total amount of silica in the dispersion.

As utilized herein, the term "dispersion" means a suspension of solid particles (e.g., fumed silica and colloidal silica) in a liquid medium (e.g., water), wherein at least 95 wt. % (e.g., at least about 97 wt. % or at least about 99 wt. %) of the total solid particles in the liquid medium remain suspended in the liquid medium (i.e., are colloidally stable in that the particles do not settle to the bottom of a container) for at least about 24 hours when the suspension is allowed to stand at a temperature of about 25° C. following the preparation thereof.

Fumed silica particles, which are also referred to as pyrogenic silica particles, are produced by pyrogenic processes and have the chemical composition $SiO_2$. Fumed silica particles, typically, are aggregate particles of smaller primary particles, which are held together by relatively strong cohesive forces, such that the aggregate particles are not broken down into primary particles when dispersed in a liquid (e.g., aqueous) medium. Aggregate fumed silica particles may also form larger agglomerate particles, which are held together by relatively weak cohesive forces. Agglomerate particles usually are broken down into aggregate particles when dispersed in a liquid (e.g., aqueous) medium.

The surface area of most metal oxide particles can be determined by the method of S. Brunauer, P. H. Emmet, and I. Teller, *J. Am. Chemical Society*, 60, 309 (1938), which is commonly referred to as the BET method. As noted above, fumed silica particles suitable for use in the invention have a BET surface area of about 70 to about 140 $m^2/g$ (e.g., about 80 to about 130 $m^2/g$). In a preferred embodiment, the fumed silica particles have a BET surface area of about 80 to about 100 $m^2/g$ (e.g., about 90 $m^2/g$).

Colloidal silica particles are generally produced by "wet chemistry" processes and also have the chemical composition $SiO_2$. Typically, colloidal silica is produced by the addition of an acid to an alkaline metal silicate solution (e.g., sodium silicate solution), thereby causing the silicate to polymerize and form discrete particles of amorphous silica. Colloidal silica particles, typically, are discrete, substantially spherical silica particles having no internal surface area. Commercially available colloidal silicas suitable for use in the invention include, but are not limited to, those sold under the trademarks Ludox® (Grace Davison), Bindzil® (Akzo Nobel), and Nyacol® (Akzo Nobel). Colloidal silica particles suitable for use in the invention have a BET surface area of 110 to about 150 $m^2/g$. In a preferred embodiment, the colloidal silica particles have a BET surface area of about 120 to about 140 $m^2/g$ (e.g., about 130 $m^2/g$).

Generally, the total amount of silica in the dispersion is about 35% to about 60% (e.g., about 35% to about 55% or about 35% to about 50%) by weight of the dispersion. Preferably, the total amount of silica in the dispersion is about 38% to about 60% (e.g. about 38% to about 55% or about 38% to about 50%), more preferably about 40% to about 60% (e.g., about 40% to about 55% or about 40% to about 50%) by weight of the dispersion. In another preferred embodiment, the total amount of silica in the dispersion is about 35% to about 50% (e.g., about 35% to about 45%) by weight of the dispersion.

Generally, the fumed silica particles comprise about 25% to about 80% by weight of the total amount of silica in the dispersion. In a preferred embodiment, the fumed silica particles comprise about 30% to about 80% by weight, more preferably about 50% to about 65% by weight of the total amount of silica in the dispersion.

As set forth above, a dispersion comprises particles suspended in a liquid medium. The inventive aqueous dispersion comprises water, preferably deionized water. The aqueous dispersion also can comprise any number of suitable water-miscible liquids, such as one or more water-miscible alcohols (e.g., methanol, ethanol, etc.) or ketones (e.g., acetone) in addition to water.

The dispersion can have any suitable pH at which the dispersion is stable. Typically, the pH of the dispersion is no less than about 7 (e.g., about 7 to about 13), preferably no less than about 8 (e.g., about 8 to about 12), more preferably no less than about 9 (e.g., about 9 to about 11). In other embodiments, the pH of the dispersion is no greater than about 13, preferably no greater than about 12, and more preferably no greater than about 11. The pH of the dispersion can be adjusted using any suitable method, such as via the addition of an acid (e.g., mineral acid, acidic cation exchange resin, etc.) or a base (e.g., an alkali metal hydroxide, basic anion exchange resin, etc.).

Generally, the dispersion of fumed silica particles, colloidal silica particles, and water exhibits a relatively low viscosity. The viscosity can be measured, for example, using a Brookfield LVT viscometer (spindle no. 5, 60 rpm, two minute spin at 25° C.). Alternatively, the viscosity may be measured pursuant to ASTM D 2196 (06.01) entitled "Rheological Properties of Non-Newtonian Materials by Rotational (Brookfield) Viscometer." Typically, the aqueous dispersion of the invention has a viscosity of less than about 100 centipoise (cPs) (e.g., about 10 to about 100 cPs) immediately following the preparation thereof. Preferably, the aqueous dispersion has a viscosity of less than about 75 cPs (e.g., about 10 to about 75 cPs), more preferably less than about 50 cPs (e.g., about 15 to about 50 cPs), most preferably less than about 30 cPs (e.g., about 15 to about 30 cPs) immediately following the preparation thereof. In other embodiments, the aqueous dispersion has a viscosity of at least about 5 cPs, preferably at least about 10 cPs, more preferably at least about 15 cPs. It is preferred that the viscosity of the dispersion increases by less than about 50%, more preferably less than about 25%, most preferably less than about 10% when the dispersion is allowed to stand at a temperature of about 25° C. for 60 days, 90 days, 180 days, and/or 270 days immediately following the preparation thereof.

While the dispersion can contain other additives, in certain applications it is preferred that the dispersion consists essentially of, or consists of, fumed silica particles, colloidal silica particles, and water. The phrase "consists essentially of," as used herein to describe the inventive dispersion, excludes any component that would negatively impact the colloidal stability of the aqueous dispersion (e.g., any component that would cause the fumed silica particles and/or colloidal silica particles to settle out of the dispersion).

The dispersion can be prepared by any suitable method. Preferably, the dispersion is prepared by a method comprising (a) mixing fumed silica particles with an aqueous vehicle under high shear conditions to form a mixture of fumed silica particles, such that the mixture does not coagulate, and (b) adding colloidal silica particles to the mixture of (a), so as to form a dispersion of fumed silica particles, colloidal silica particles, and water. Mixing under high shear conditions provides an even distribution of the components of the dispersion, thereby forming a substantially uniform or homogeneous mixture of the components. Mixing under high shear conditions also can improve the rheology of the dispersion and can increase the strength and uniformity of any final article prepared from the dispersion. High shear mixers are described in U.S. Pat. Nos. 4,225,247, 4,552,463, 4,889,428, 4,944,595, and 5,061,319.

In a related aspect, the invention provides a coating composition comprising at least one binder and the aqueous dispersion of fumed silica particles, colloidal silica particles, and water described herein. Any suitable binder(s) can be used in accordance with the coating composition of the invention. Preferably, the binder is selected from the group consisting of cellulose esters, cellulose ethers, starch, vinyl polymers, acrylic polymers, polyesters, polycarbonate polymers, polyamides, polyimides, epoxy polymers, phenolic polymers, polyolefins, copolymers thereof, and mixtures thereof. In another preferred embodiment, the binder is a vinyl polymer selected from the group consisting of polyvinyl alcohol, polyvinyl pyrrolidine, and mixtures thereof.

The binder(s) can be present in the coating composition in any suitable amount. Typically, the total amount of binder(s) in the coating composition is less than about 20% (e.g., about 0.1% to about 20% or about 0.5% to about 20%), preferably less than about 15% (e.g., about 0.5% to about 15%), more preferably less than about 10% (e.g., about 1% to about 10%) by weight of the coating composition. In other embodiments, the total amount of binder(s) in the coating composition is greater than about 0.1%, preferably greater than about 0.5%, more preferably greater than about 1% by weight of the coating composition. The desired amount of binder(s) in the aqueous dispersion depends on the particular binder(s). For example, the optimum amount of polyvinyl alcohol in the coating composition may be different from the optimum amount of polyvinyl pyrrolidine in the coating composition.

The coating composition can be prepared by any suitable method. Preferably, the coating composition is prepared by combining an aqueous dispersion as described herein (e.g., an aqueous dispersion comprising fumed silica particles, colloidal silica particles, and water) with at least one binder to produce the coating composition. The pH of the coating composition can be adjusted at any stage during its preparation so as to prevent flocculation and/or coagulation of the coating composition or any component used to produce the coating composition (e.g., a dispersion of fumed silica particles and colloidal silica particles). For example, the pH can be adjusted during the preparation of the dispersion before mixing the dispersion with the binder(s). The pH also can be adjusted after the dispersion is mixed with the binder(s) (i.e., after forming the coating composition). In any case, it is preferred that the pH of the coating composition be about 7 to about 13 (e.g., about 8 to about 12). In certain embodiments, such as when maximum dispersion stability is desired, it is preferred that the pH of the coating composition be about 9 to about 12, more preferably about 9 to about 11 (e.g., about 9 to about 10). The pH can be adjusted using any suitable method, such as via the addition of an acid (e.g., mineral acid, acidic cation exchange resin, etc.) or a base (e.g., an alkali metal hydroxide, basic anion exchange resin, etc.).

The coating composition of the invention also can comprise one or more other additives, such as surfactants (e.g., cationic surfactants, anionic surfactants such as longchain alkylbenzene sulfonate salts and long-chain, preferably branched chain, alkylsulfosuccinate esters, nonionic surfactants such as polyalkylene oxide ethers of longchain, preferably branched-chain alkyl group-containing phenols and polyalkylene oxide ethers of long-chain alkyl alcohols, and fluorinated surfactants), hardeners (e.g., active halogen compounds, vinylsulfone compounds, aziridine compounds, epoxy compounds, acryloyl compounds, isocyanate compounds, etc.), pigment dispersants, thickeners (e.g., carboxymethyl cellulose (CMC)), flowability improvers, antifoamers (e.g., octyl alcohol, silicone-based antifoamers, etc.), foam inhibitors, releasing agents, foaming agents, penetrants, coloring dyes, coloring pigments, whiteners (e.g., fluorescent whiteners), preservatives (e.g., p-hydroxybenzoate ester compounds, benzisothiazolone compounds, isothiazolone compounds, etc.), antifungal agents, yellowing inhibitors (e.g., sodium hydroxymethanesulfonate, sodium p-toluenesulfinate, etc.), ultraviolet absorbers (e.g., benzotriazole compounds having an hydroxy-dialkylphenyl group at the 2-position), antioxidants (e.g., sterically hindered phenol compounds), antistatic agents, pH regulators (e.g., sodium hydroxide, sodium carbonate, sulfuric acid, hydrochloric acid, phosphoric acid, citric acid, etc.), water-resisting agents, wet strengthening agents, and dry strengthening agents. In addition to these additives, the coating composition also can comprise a mordant. Suitable mordants include, for example, poly(ethyleneimine), poly(vinylbenzyl trimethylammonium chloride), poly(diallyldimethyl ammonium chloride), and mixtures thereof.

The invention further provides a recording medium comprising a substrate and a coating composition as described herein (e.g., a coating composition comprising at least one binder and an aqueous dispersion comprising fumed silica particles, colloidal silica particles, and water) applied to at least a portion of the substrate. The substrate used in conjunction with the invention can be either transparent or opaque, and can be made of any suitable material. Examples of such materials include, but are not limited to, polyesters (e.g., poly(ethylene terephthalate)), diacetate resins, triacetate resins, acrylic resins, polycarbonate resins, polyvinyl chloride resins, polyimide resins, cellophane and celluloid, glass sheets, metal sheets, plastic sheets, paper (e.g., cellulose or synthetic paper), photobase material (e.g., paper coated with polyethylene or baryte), pigment-containing opaque films, and foamed films. Preferably, the substrate comprises a polymer film, paper, or a photo-base material. When the substrate comprises a polymer film, the polymer film is preferably selected from the group consisting of poly(ethylene terephthalate), polyvinyl chloride, or mixtures thereof. When the substrate comprises a paper, the paper is preferably cellulose paper, and when the substrate comprises a photo-base material, preferably the photo-base material is coated with at least one material selected from the group consisting of polyethylene, baryte, and mixtures thereof. Although the invention is well suited to the production of gloss and semi-gloss recording media, the invention also can be used to produce other types of recording media (e.g., recording media having a matte finish).

The recording medium described herein can be prepared in accordance with the invention by a method comprising (a) providing a substrate, (b) providing a coating composition as described herein (e.g., a coating composition comprising at least one binder and an aqueous dispersion comprising fumed silica particles, colloidal silica particles, and water), (c) coating at least a portion of the substrate with the coating composition to provide a coated substrate, and (d) drying the coated substrate to provide a recording medium. Furthermore, the coating composition may be repeatedly applied to the substrate to provide a recording medium having a coating with a desired thickness.

Any suitable method can be used to coat a portion of the substrate with the inventive coating composition. Suitable methods include, but are not limited to, roll coating, blade coating, air knife coating, rod coating (e.g., using a Meyer rod or the like), bar coating, cast coating, gate roll coating, wire bar coating, short-dowel coating, slide hopper coating, curtain coating, flexographic coating, gravure coating, Komma coating, size press coating in the manner of on- or off-machine, and die coating, with rapid, inexpensive methods such as rod coating and blade coating being preferred. The coating applied to the substrate can be of any suitable thickness. In particular, the coating is preferably less than about 50 $\mu$m in thickness (e.g., about 1 to about 50 $\mu$m), more preferably less than about 40 $\mu$m (e.g., about 5 to about 40 $\mu$m), and most preferably less than about 30 $\mu$m (e.g., about 10 to about 30 $\mu$m). The coating also preferably is greater than about 1 $\mu$m, more preferably greater than about 5 $\mu$m, most preferably greater than about 10 $\mu$m in thickness.

After application of the coating composition to the substrate, the coated substrate can be dried using any suitable method or combination of methods to provide the recording medium. Suitable drying methods include, but are not limited to, air or convection drying (e.g., linear tunnel drying, arch drying, air-loop drying, sine curve air float drying, etc.), contact or conduction drying, and radiant-energy drying (e.g., infrared drying and microwave drying).

The following examples further illustrate the invention but, of course, should not be construed as in any way limiting its scope.

EXAMPLE 1

This example demonstrates the preparation of an aqueous dispersion according to the invention. A high-shear mixer was charged with 16.5 kg of water and 0.03 kg of a 37 wt. % HCl solution. While the high-shear mixer was operating, 13.6 kg of fumed silica particles having a BET surface area of about 90 m$^2$/g (Cab-O-Sil® L-90, available from Cabot Corporation) was slowly added to the water and HCl solution. Next, 7.1 kg of water was added to the mixer, followed by approximately 0.48 kg of a 45 wt. % KOH solution. Lastly, 18.8 kg of a 50 wt. % colloidal silica dispersion containing colloidal silica particles having a BET surface area of about 130 m$^2$/g (Ludox® TM-50, available from Grace Davison) was added to the mixture of water, HCl, and fumed silica particles, and the mixer was stopped.

The product was a stable, aqueous dispersion comprising fumed silica particles, colloidal silica particles, and water. The aqueous dispersion had a total silica content of about 40% by weight of the dispersion.

EXAMPLE 2

This example demonstrates the preparation of an aqueous dispersion according to the invention. A high-shear mixer was charged with 625 kg of water and 0.77 kg of a 37 wt. % HCl solution. While the high-shear mixer was operating, 510 kg of fumed silica particles having a BET surface area of about 130 m$^2$/g (Cab-O-Sil® LM-130, available from Cabot Corporation) was slowly added to the water and HCl solution. Next, 305 kg of water was added to the mixer, followed by approximately 19.2 kg of a 45 wt. % KOH solution. Lastly, 730 kg of a 50 wt. % colloidal silica dispersion containing colloidal silica particles having a BET surface area of about 130 m$^2$/g (Ludox® TM-50, available from Grace Davison) was added to the mixture of water, HCl, and fumed silica particles, and the mixer was stopped.

The product was a stable, aqueous dispersion comprising fumed silica particles, colloidal silica particles, and water. The aqueous dispersion had a total silica content of about 40% by weight of the dispersion.

EXAMPLE 3

This example demonstrates the preparation of an aqueous dispersion according to the invention. A high-shear mixer was charged with 235 g of water and 0.66 g of a 37 wt. % HCl solution. While the high-shear mixer was operating, 217 g of fumed silica particles having a BET surface area of about 90 m$^2$/g (Cab-O-Sil® L-90, available from Cabot Corporation) was slowly added to the water and HCl solution. Next, 118 g of water was added to the mixer, followed by approximately 20 g of a 45 wt. % KOH solution. Lastly, 195 g of a 50 wt. % colloidal silica dispersion containing colloidal silica particles having a BET surface area of about 130 m$^2$/g (Ludox® TM-50, available from Grace Davidson) was added to the mixture of water, HCl, and fumed silica particles, and the mixer was stopped.

The product was a stable, aqueous dispersion comprising fumed silica particles, colloidal silica particles, and water. The aqueous dispersion had a total silica content of about 40% by weight of the dispersion.

EXAMPLE 4

This example demonstrates the preparation of a coating composition in accordance with the invention. All of the amounts set forth in this example are expressed as parts per 100 g of the final coating composition. A mixer was charged with 8.7 g of the aqueous dispersion of Example 1. Next, while the mixer was operating, 2.5 g of a commercially available starch binder (Ethylex® 2025, available from A. E. Staley Manufacturing Company) and 2.5 g of a commercially available polyvinyl alcohol binder (Airvol® 523S, available from Air Products and Chemicals, Inc.) were added to the mixer. The resulting mixture was then diluted with 86.3 g of deionized water and mixed for an additional 15 minutes.

The product was a coating composition comprising water, a starch binder, a polyvinyl alcohol binder, and an aqueous dispersion comprising fumed silica particles, colloidal silica particles, and water. The coating composition contained 8.5% silica by wieght of the coating composition. The coating composition had a viscosity of approximately 20 cPs, as measured using a Brookfield LVT viscometer (spindle no. 3, 20 rpm, two minute spin at 25° C.).

EXAMPLE 5

This example demonstrates the preparation of a recording medium in accordance with the invention. The coating composition of Example 4 was applied to the surface of a cellulose paper substrate using a #6 Meyer rod. The coated substrate was then dried at 107° C. for approximately 5 minutes.

The product was a recording medium comprising a substrate having a coating composition applied to at least a portion of the substrate. The recording medium exhibited intense and vivid color when printed with a test pattern consisting of blocks of black, cyan, magneta, yellow, blue, green, and red (using a Hewlett-Packard PhotoSmart® 1210 inkjet printer).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An aqueous dispersion comprising fumed silica particles, colloidal silica particles, and water, wherein the fumed silica particles have a BET surface area of about 70 to about 140 m$^2$/g, the colloidal silica particles have a BET surface area of about 110 to about 150 m$^2$/g, the total amount of silica in the dispersion is about 35% to about 60% by weight, and the fumed silica particles comprise about 25% to about 80% by weight of the total amount of silica in the dispersion.

2. The aqueous dispersion of claim 1, wherein the total amount of silica in the dispersion is at least about 38% to about 60% by weight.

3. The aqueous dispersion of claim 2, wherein the total amount of silica in the dispersion is at least about 40% to about 60% by weight.

4. The aqueous dispersion of claim 1, wherein the total amount of silica in the dispersion is about 35% to about 50% by weight.

5. The aqueous dispersion of claim 1, wherein the fumed silica particles have a BET surface area of about 80 to about 100 m$^2$/g.

6. The aqueous dispersion of claim 1, wherein the colloidal silica particles have a BET surface area of about 120 to about 140 m$^2$/g.

7. The aqueous dispersion of claim 1, wherein the fumed silica particles comprise about 30% to about 80% by weight of the total amount of silica in the dispersion.

8. The aqueous dispersion of claim 7, wherein the fumed silica particles comprise about 50% to about 65% by weight of the total amount of silica in the dispersion.

9. The aqueous dispersion of claim 3, wherein the fumed silica particles comprise about 30% to about 80% by weight of the total amount of silica in the dispersion.

10. The aqueous dispersion of claim 9, wherein the fumed silica particles comprise about 50% to about 65% by weight of the total amount of silica in the dispersion.

11. A coating composition comprising at least one binder and the aqueous dispersion of claim 1.

12. The coating composition of claim 11, wherein the total amount of silica in the dispersion is at least about 38% to about 60% by weight.

13. The coating composition of claim 12, wherein the total amount of silica in the dispersion is at least about 40% to about 60% by weight.

14. The coating composition of claim 11, wherein the total amount of silica in the dispersion is about 35% to about 50% by weight.

15. The coating composition of claim 11, wherein the fumed silica particles have a BET surface area of about 80 to about 100 m$^2$/g.

16. The coating composition of claim 11, wherein the colloidal silica particles have a BET surface area of about 120 to about 140 m$^2$/g.

17. The coating composition of claim 11, wherein the fumed silica particles comprise about 30% to about 80% by weight of the total amount of silica in the dispersion.

18. The coating composition of claim 17, wherein the fumed silica particles comprise about 50% to about 65% by weight of the total amount of silica in the dispersion.

19. The coating composition of claim 13, wherein the fumed silica particles comprise about 30% to about 80% by weight of the total amount of silica in the dispersion.

20. The coating composition of claim 19, wherein the fumed silica particles comprise about 50% to about 65% by weight of the total amount of silica in the dispersion.

21. The coating composition of claim 11, wherein the binder is selected from the group consisting of cellulose esters, cellulose ethers, starch, vinyl polymers, acrylic polymers, polyesters, polycarbonate polymers, polyamides, polyimides, epoxy polymers, phenolic polymers, polyolefins, copolymers thereof, and mixtures thereof.

22. The coating composition of claim 21, wherein the binder is a vinyl polymer selected from the group consisting of polyvinyl alcohol, polyvinyl pyrrolidine, and mixtures thereof.

23. The coating composition of claim 11, wherein the total amount of binder in the coating composition is about 0.5% to about 20% by weight.

24. A recording medium comprising a substrate and a coating composition applied to at least a portion of the substrate, wherein the coating composition comprises at least one binder and an aqueous dispersion comprising fumed silica particles, colloidal silica particles, and water, and wherein the fumed silica particles have a BET surface area of about 70 to about 140 m$^2$/g, the colloidal silica particles have a BET surface area of about 110 to about 150 m$^2$/g, the total amount of silica in the aqueous dispersion is about 35% to about 60% by weight, and the fumed silica particles comprise about 25% to about 80% by weight of the total amount of silica in the dispersion.

25. The recording medium of claim 24, wherein the substrate is paper.

26. The recording medium of claim 24, wherein the total amount of silica in the dispersion is at least about 38% to about 60% by weight.

27. The recording medium of claim 26, wherein the total amount of silica in the dispersion is at least about 40% to about 60% by weight.

28. The recording medium of claim 24, the total amount of silica in the dispersion is about 35% to about 50% by weight.

29. The recording medium of claim 24, wherein the fumed silica particles have a BET surface area of about 80 to about 100 m$^2$/g.

30. The recording medium of claim 24, wherein the colloidal silica particles have a BET surface area of about 120 to about 140 m$^2$/g.

31. The recording medium of claim 24, wherein the fumed silica particles comprise about 30% to about 80% by weight of the total amount of silica in the dispersion.

32. The recording medium of claim 31, wherein the fumed silica particles comprise about 50% to about 65% by weight of the total amount of silica in the dispersion.

33. The recording medium of claim 27, wherein the fumed silica particles comprise about 30% to about 80% by weight of the total amount of silica in the dispersion.

34. The recording medium of claim 33, wherein the fumed silica particles comprise about 50% to about 65% by weight of the total amount of silica in the dispersion.

* * * * *